United States Patent
Cannon et al.

(10) Patent No.: US 6,393,106 B1
(45) Date of Patent: May 21, 2002

(54) TELEPHONE ANSWERING DEVICE WHICH RECORDS VOICE MESSAGE OF THIRD PARTY CALLER

(75) Inventors: Joseph M. Cannon, Harleysville; James A. Johanson, Emmaus, both of PA (US)

(73) Assignee: Agere Systems Guardian Corp., Orlando, FL (US)

( * ) Notice: Subject to any disclaimer, the term of this patent is extended or adjusted under 35 U.S.C. 154(b) by 0 days.

(21) Appl. No.: 09/056,621

(22) Filed: Apr. 8, 1998

(51) Int. Cl.$^7$ .................. H04M 1/64; H04M 11/00; H04M 1/56; H04M 3/42

(52) U.S. Cl. .................. 379/67.1; 379/68; 379/88.19; 379/93.35; 379/142.08; 379/201.01; 379/209.01

(58) Field of Search .................. 379/34, 35, 70, 379/67.1, 74, 85, 88.01, 88.11, 88.12, 88.16, 88.17, 88.22, 88.25, 88.26, 93.21, 93.25, 100.05, 100.12, 102.01, 93.35, 156–158, 88.19, 88.2, 88.21, 209.01, 68, 142.08, 201.01, 201.1

(56) References Cited

U.S. PATENT DOCUMENTS

| | | | | |
|---|---|---|---|---|
| 4,899,358 A | * | 2/1990 | Blakely ................ 379/67.1 |
| 4,942,598 A | * | 7/1990 | Davis .................. 379/67.1 |
| 5,023,868 A | * | 6/1991 | Davidson et al. ........ 370/62 |
| 5,109,410 A | | 4/1992 | Suhami et al. .......... 379/430 |
| 5,155,761 A | * | 10/1992 | Hammond ............. 379/67.1 |
| 5,268,957 A | * | 12/1993 | Albrecht ............... 379/67.1 |
| 5,303,301 A | * | 4/1994 | Takahata ............... 379/142 |
| 5,394,445 A | * | 2/1995 | Ball et al. ............. 379/67.1 |
| 5,422,942 A | * | 6/1995 | Kakwashima ........... 379/212 |
| 5,425,097 A | * | 6/1995 | Pula ................... 379/396 |
| 5,471,519 A | * | 11/1995 | Howe et al. ............ 379/67 |
| 5,515,423 A | | 5/1996 | Beck et al. ............. 379/93 |
| 5,557,658 A | * | 9/1996 | Gregorek et al. ........ 379/67.1 |
| 5,680,447 A | * | 10/1997 | Diamond et al. ........ 379/215 |
| 5,799,060 A | * | 8/1998 | Kennedy et al. ......... 379/29 |
| 5,857,011 A | * | 1/1999 | Kennedy et al. ......... 379/32 |
| 5,883,942 A | * | 3/1999 | Lim et al. ............. 379/142 |
| 5,930,338 A | * | 7/1999 | McKendry et al. ....... 379/88.25 |
| 5,937,034 A | * | 8/1999 | Kennedy et al. ......... 379/32 |
| RE36,354 E | * | 10/1999 | Cotton et al. .......... 379/157 |
| 6,064,732 A | * | 5/2000 | Pezzullo et al. ........ 379/396 |

* cited by examiner

Primary Examiner—Allan Hoosain
(74) Attorney, Agent, or Firm—William H. Bollman

(57) ABSTRACT

Apparatus and processes of operating a telephone answering device (TAD) to record a message from a third party caller who calls when a first telephone line connected to the TAD is busy when the third party calls. After the third party hangs up, the automatic third party callback module calls the third party back based on a telephone number obtained from call related information, e.g., Caller ID information. The TAD may alternatively or additionally automatically answer selected third party callers to a second telephone line of the TAD possibly based on a match between call related information with respect to the third party caller, e.g., Caller ID, and pre-entered telephone numbers of those the user desires to have the TAD automatically answer when busy on the first telephone line.

19 Claims, 5 Drawing Sheets

TELEPHONE ANSWERING DEVICE WHICH RECORDS VOICE MESSAGE OF THIRD PARTY CALLER

BACKGROUND OF THE INVENTION

1. Field of the Invention

This invention relates to a telephone answering device, and more particularly to a telephone answering device capable of answering a third party caller on a second telephone line.

2. Background of Related Art

Telephone answering devices (TADs) (i.e., answering machines) are useful devices for the home or small office. A conventional TAD operates on a single telephone line and answers an incoming call to an unused (i.e., on-hook) telephone after a desired number of rings. The TAD causes the telephone line to enter an off-hook condition, then plays an outgoing message (OGM) to the caller. After the OGM, the caller may leave a voice message on the TAD. At a later time the voice message is replayed by the user, either local to the TAD or via remote connection from another telephone.

Unfortunately, a conventional TAD has limited usefulness when the user is already on the telephone. When the telephone line is already in an off-hook condition and in use between the user and a first caller, any incoming third party calls will be unsuccessful and receive a busy signal from the telephone company. Thus, the third party caller must continue to dial the telephone number of the user until such time as the telephone line is back in an on-hook condition.

FIG. 5 shows a conventional TAD capable of answering an incoming call on a telephone line. In FIG. 5, a TAD 11 is connected to a telephone company central office 13 via a telephone line 14. A telephone line interface (TLI) 48 in the TAD 11 provides the conventional isolation, DC and AC impedance as required by telephone company standards. The TLI 48 also provides a ring detect signal to a controller 18. Controller 18 may be any suitable processor, e.g., microprocessor, microcontroller, or digital signal processor (DSP). The ring detect signal indicates to the controller 18 the ringing of an incoming call on the telephone line 14.

After a desired number of ring signals, the TAD 11 causes the TLI 48 to place the telephone line in an off-hook state, and instructs a voice recorder/playback audio module 20 to play an outgoing message (OGM) on the telephone line 14 to the caller. Upon completion of the OGM, the caller may leave a voice message in voice memory 21 under the control of controller 18. A keypad 26 allows the user to select various modes of operation, including the playback of voice messages.

Services providing call related information regarding a third party caller are useful to users of a telephone system, but fall short of solving the problem of conventional TAD systems which do not allow a third party caller to leave a voice message on a TAD. One well known and popular call information service provided in the United States is Calling Identity Delivery (Caller ID). This service typically provides the telephone number and household name information of a calling party to the called party before the call is answered. Basic call information such as Caller ID information is transmitted from the local telephone company to the called party while the called party's phone is in a hung-up or on-hook state, e.g., between the first and second rings. Based on a display of the call related information, the called party may decide not to answer the incoming call and instead allow the TAD to record a voice message from the caller. The conventional TAD 11 shown in FIG. 5 includes a Caller ID detector/receiver 12 to detect and receive the telephone number and/or household name of a calling party, which is displayed on display 28.

Another telephone company service which has become well known and popular is that which allows a third party to call while the called party is already off-hook, currently known in the United States as Call Waiting. Call Waiting allows someone who is already using the telephone (i.e., in an off-hook state), to receive an audible interruption, click or other indication at the customer premises equipment that another person is calling, and then to establish a connection with the third party caller as desired by placing the first party on hold.

More recently, call information has been combined with third party caller services to provide an advanced service currently known as Calling Identity Delivery on Call Waiting (CIDCW) in the United States. CIDCW service allows a customer, while off-hook on an existing call, to receive information about an incoming calling party on a waited call before answering that incoming call waiting call. Transmission of the third party's call information with this service takes place almost immediately after the customer premises equipment (CPE) is alerted to the new call with a CPE Alerting Signal (CAS). The CAS is a short burst of a combination of high frequencies that are appended to the Subscriber Alerting Signal (SAS) otherwise known as the "Call Waiting Tone". Using CIDCW, a user can decide whether or not to answer a third party incoming call waiting call. If the third party call is not answered, there is no ability for the third party caller to leave a voice message with the user via the dialed number.

Customer premises equipment capable of receiving on-hook call information such as Caller ID (CID) including Calling Number Delivery (CND) and Calling Name Delivery (CNAM), is generally referred to as Type 1 customer premises equipment. Customer premises equipment additionally capable of receiving call information when off-hook or already in an established call with another party (CIDCW) is generally referred to as a Type 2 customer premises equipment. With Type 2 customer premises equipment and Caller ID service, the called party is alerted to the availability of call information for an incoming call waiting call with an alerting CAS tone. The alerting CAS tone is acknowledged with a DTMFD, and the FSK data corresponding to the call information follows from the central office to the customer premises equipment.

At any time after a called party having CIDCW service has been alerted to the availability of call information for an incoming call waiting call and while a party is still in the waited state, CIDCW allows the customer to flash the switch hook to retrieve the waited call while placing the first caller on hold, and subsequently to go back and forth between the current far-end party and the held party by flashing. CIDCW provides all the capabilities associated with the current CW service, with the additional capability of providing CID data to a customer on waited calls. Therefore, CIDCW is considered an enhancement of the CW service. A telephone line may either have call waiting (CW) or CIDCW service enabled, but not both at the same time.

Thus, CID is a service which provides display data for a user of a telephone to make a decision as to whether or not to answer an incoming call, and if not to let the TAD answer the call. However, there is no provision in CIDCW service to allow the third party caller to leave a voice message on a TAD at the user's premises. Thus, CIDCW service is not conventionally applicable for use with a TAD.

There is a need for a TAD which is capable of allowing a third party caller to leave a voice message at a called party's TAD without requiring a user to hang up on an existing call.

SUMMARY OF THE INVENTION

In accordance with the principles of the present invention, a telephone answering device comprises a processor, a voice recorder/playback module, a call related information detector/receiver, an automatic callback module, and a first telephone line interface. A DTMF generator automatically dials a telephone number based on information received by the call information detector/receiver.

The present invention further provides methods for automatically calling back a third party caller from a telephone answering device. In one method, a first telephone call is established on a first telephone line with customer premises equipment. An indication of call related information with respect to a third party caller is received, and the call related information is stored for access by the telephone answering device. Then, a callback is initiated to the third party caller from the telephone answering device based on the stored call related information.

In another method, a plurality of predetermined call related information is stored in a telephone answering device. A first telephone call is established on a first telephone line with customer premises equipment. Thereafter, indication is received relating to call related information with respect to a third party caller on a second telephone line. The call related information with respect to said third party caller is compared to the pre-stored call related information, and if a match is found, the third party caller on the second telephone line is automatically answered.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention provides a telephone answering device (TAD) and method for answering a third party telephone call using a second telephone line.

Figure 1:
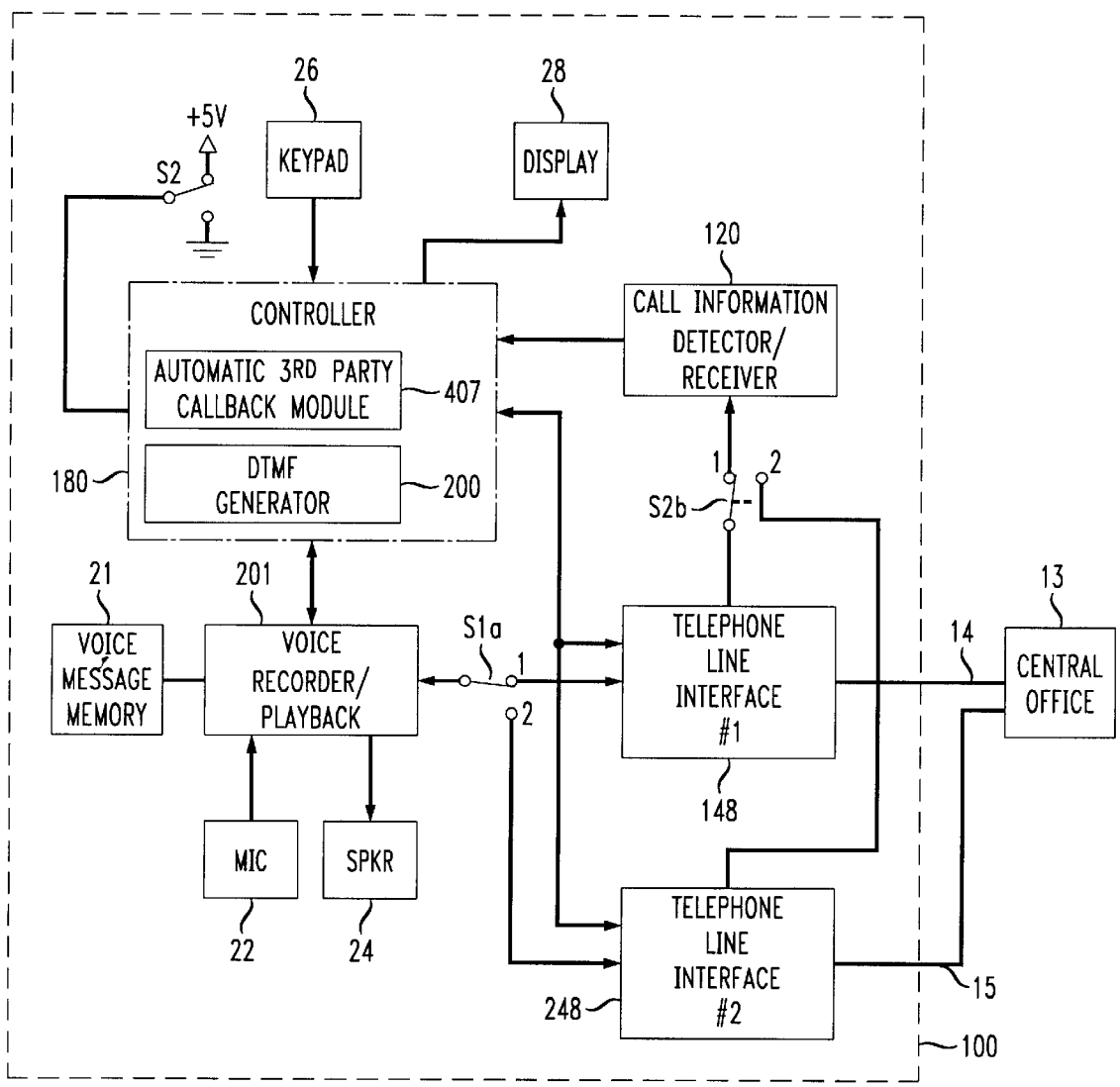
FIG. 1 shows a telephone answering device (TAD) capable of operation on two telephone lines in accordance with the principles of the present invention.

FIG. 1 shows a TAD capable of operation on two telephone lines to allow a third party caller to record a voice message in the TAD, in accordance with the principles of the present invention.

In the embodiment of FIG. 1, the TAD 100 includes two telephone line interfaces (TLIs) 148, 248 for interconnection with a central office 13 via two separate telephone lines 14 and 15. The first TLI 148 interconnects a first telephone line 14 with a voice recorder/playback module 201 when a switch S1a is in a first position 1. A second switch S1b operated substantially simultaneously with switch S1a allows, in a first position 1, a call information detector/receiver 120 (e.g., for detecting and receiving Caller ID information). The call information detector/receiver 120 detects and receives call related information regarding a caller on the first telephone line 14.

When in respective second positions 2, switches S1a and S1b allow the TAD 100 to operate on the second telephone line 15 by interconnecting the second TLI 248 to the voice recorder/playback module 201 and call information detector/receiver 120, respectively.

Switches S1a and S1b are separate poles of a double pole, double throw (DPDT) switch. Switches S1a, S1b may alternatively be separate switches appropriately controlled. Moreover, switches S1a, S1b may be virtually any flow through switching device, e.g., mechanical switches, mechanical relays, electronic switches, or multiplexers.

Switch S1a may be eliminated by providing two voice recorder/playback modules 201, one for each of the first and second TLIs 148, 248. Alternatively, switch S1a may be eliminated by inputting the output of both the first and second TLIs 148, 248 into a single line interface of a voice recorder/playback module 201.

Moreover, if call related information is not desired with respect to the second telephone line 15, switch S1b may be eliminated by interconnecting the call information detector/receiver 120 directly with only the first TLI 148. Alternatively, a second call information detector/receiver may be implemented in TAD 100 and interconnected directly to the second TLI 248 to eliminate the need to switch the single call information detector/receiver 120 between the two separate TLIs 148, 248.

The inventive TAD 100 further includes a dual tone, multiple frequency (DTMF) generator 200 implemented within the controller 180. Alternatively, the DTMF generator 200 may be separate from the controller 180 but in communication with the controller 180. The DTMF generator 200 provides touch tone signals for use by the TAD 100 to dial out on either the first or second telephone line 14, 15.

This embodiment of the TAD 100 further includes an automatic third party callback module 407, which is preferably a software module included within the program code of the controller 180. Of course, the automatic third party callback module 407 may be implemented separate from the controller 180, but will preferably be in communication with the controller 180.

Switch S2 is optional and is used to signal the controller 180 to enable the automatic third party callback module. Certainly, switch S2 can be replaced with a function on keypad 26, and/or with a software flag which is set or reset based on user input to the controller 180.

Figure 2:
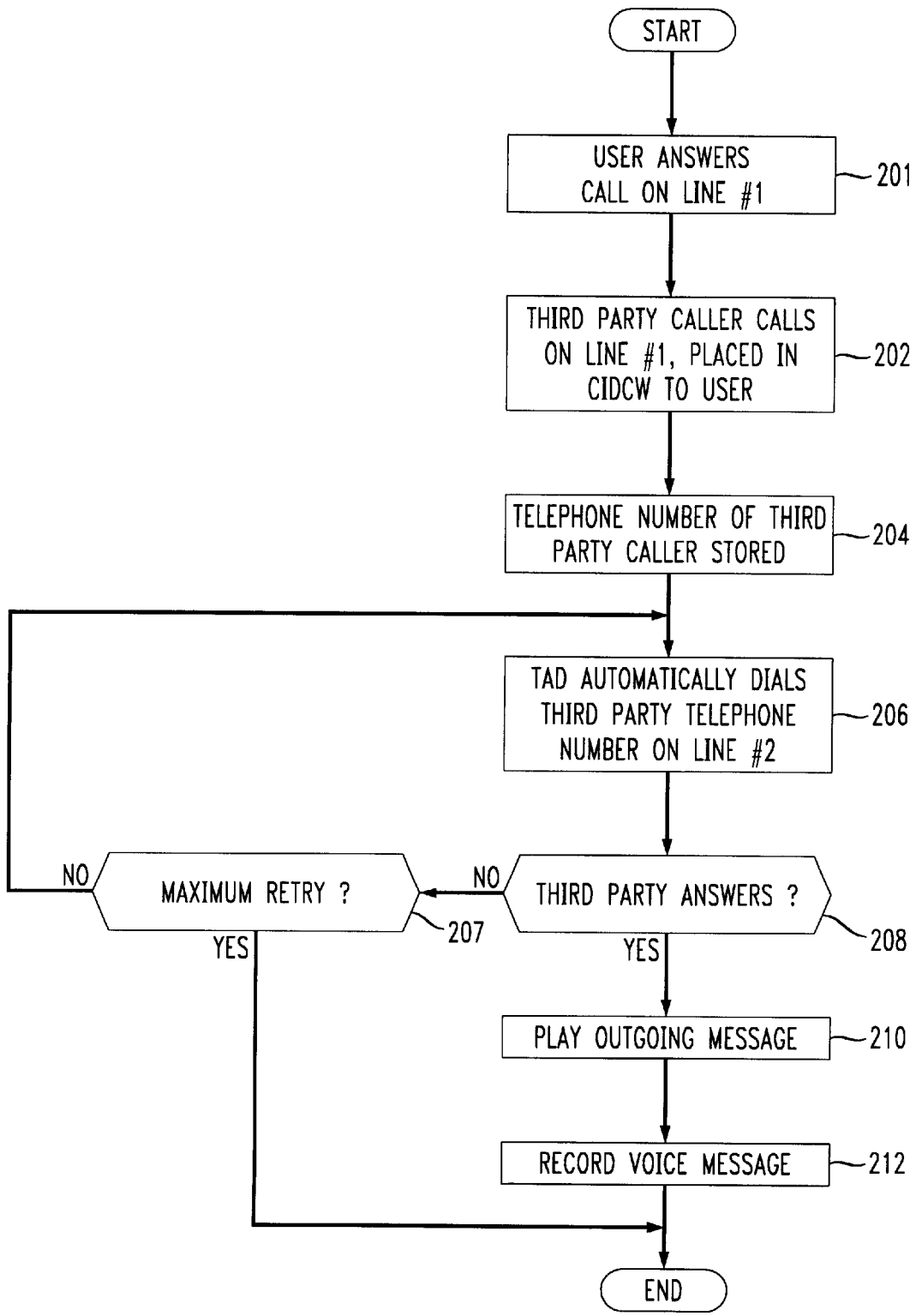
FIG. 2 is a flow chart showing the process by which the TAD of FIG. 1 automatically allows a third party caller to leave a voice message at a busy TAD.

This embodiment relates to a process whereby a third party caller to a busy first telephone line is permitted to leave a voice message on a TAD device. FIG. 2 is a flow chart showing the process by which the TAD of FIG. 1 automatically allows a third party caller to leave a voice message when the first telephone line 14 is busy. The process is described with respect to Type 2 customer premises equipment capable of receiving call related information in an off-hook condition, e.g., CIDCW.

With reference to FIGS. 1 and 2, the user establishes a first telephone call on the first telephone line 14 in the first step 201. Then, while the user is busy on the first telephone line 14, a third party attempts to call the user at the telephone number of the first telephone line 14 in step 202. However, since the user is already in an established call utilizing the first telephone line 14, the call related information and a ring signal with respect to the third party is indicated to the user, e.g., via CIDCW. The user has the option, based on the displayed Caller ID information, as to whether or not to answer the third party call using the CIDCW service on the first telephone line 14. If the user decides to answer the third party call, then the other party on the first telephone line 14 is placed on hold by the central office 13 in the conventional fashion. However, if the user decides not to answer the third party call, then the automatic third party callback module 407 is activated (unless disabled by software control or enabling switch S2).

In step 204, the telephone number of the third party caller from the call related information detected by the call information detector/receiver 120 is stored in memory accessible by (and/or in) the controller 180.

In step 206, if enabled, the automatic third party callback module 407 automatically controls the TAD 100 to dial out to the second telephone line 15. The third party's telephone number is dialed by DTMF generator 200 and output via the second TLI 248 on the second telephone line 15. Optionally, between steps 204 and 206, the TAD 100 may wait until the third party hangs up before proceeding to step 206 to avoid unsuccessful attempts to callback the third party caller.

In decision step 208, the TAD 100 determines if the third party has answered the automatic callback from TAD 100 dialed on the second telephone line 15. If not, step 206 is repeated until the third party answers. A timeout or maximum retry limit may be tested in step 207 to exit the automatic third party callback module 407, e.g., after a predetermined number of unsuccessful callback tries.

Once the third party answers, the outgoing message (OGM) from the voice recorder/playback module 201 is played on the second telephone line 15 in step 210. This outgoing message may be different from an outgoing message played when the TAD 100 is otherwise receiving voice messages in a conventional fashion. For instance, the outgoing message in step 210 may say "You just called me, but I am currently on my other line. Please leave a message." The outgoing message may be pre-stored in the voice recorder/playback module 201 and/or may be customized by the user upon installation of the TAD 100.

After having answered the third party callback call and hearing the OGM, the third party may record a voice message on the TAD 100 in step 212. Thereafter, the user may retrieve the voice message along with any other voice messages recorded in voice message memory 21 in an otherwise conventional fashion.

The callbacks can be screened and authorized beforehand based on call related information, e.g., Caller ID information. For instance, the telephone number to be called back can be compared to entries in a pre-authorized list of callback targets. Alternatively, only a portion of the telephone number may be compared to the entries in the pre-authorized list, e.g., only the area code. In this way, the user may be able to screen out long distance callbacks or callbacks to telemarketers.

The pre-authorized list may be comprised of, e.g., telephone numbers or other call information manually input by the user. Alternatively, the pre-authorized list may be comprised, at least in part, the speed dial numbers currently programmed into the customer premises equipment. The pre-authorized and/or unauthorized callback telephone numbers may be input into memory of the controller 180 using keypad 26, or may be transferred from other memory in the equipment, e.g., from a list of speed dial telephone numbers.

Moreover, instead of or in addition to the pre-authorized list, the equipment may include an unauthorized list of callbacks, e.g., telephone numbers and/or households to not call back.

Figure 3:
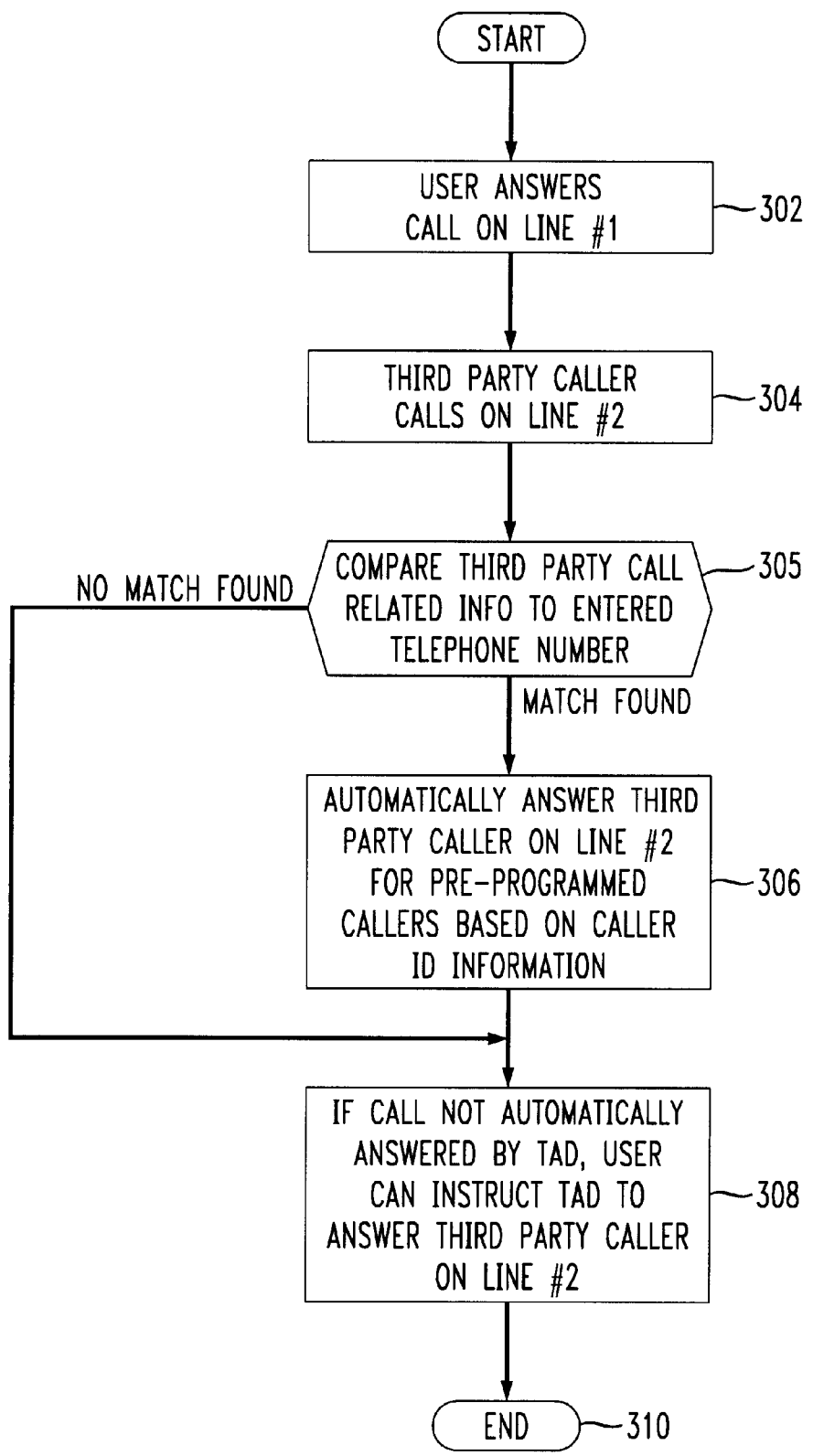
FIG. 3 is a flow chart showing another embodiment of the present invention wherein a busy TAD device automatically answers previously indicated callers on a second telephone line based on call related information.

FIG. 3 is a flow chart showing another embodiment of the present invention wherein a busy TAD device automatically answers previous callers on the second telephone line 15, either generally to all callers, or based on call related information. This second embodiment relates to a third party caller calling the user at an on-hook, second telephone line.

In step 302, the user answers a call, places a call, or otherwise establishes an off-hook condition with a second party on the first telephone line 14.

Subsequently, while the user is still in conversation with the second party on the first telephone line 14, a third party calls the user on the second telephone line 15 in step 304.

In step 305, call related information of the third party caller is detected and received in the call information detector/receiver 120 and compared to pre-authorized and/or unauthorized telephone numbers. If a match is found, the process proceeds to step 306. If a match is not found, the process proceeds to step 308.

In step 306, if the call related information with respect to the third party caller matches an entered telephone number or other call related information, the TAD 100 automatically answers the third party caller on the second telephone line 15 by initiating a standard outgoing message such as "I'm on the other line, please leave a message." or other similar greeting. Thereafter, the third party caller may leave a voice message on the TAD 100, which would be stored in voice message memory 21 via the voice recorder/playback module 201.

If a match of the telephone number or other call related information was not found in step 305, the TAD 100 is operable in a conventional fashion by allowing the second line to continually ring until the third party caller hangs up. Alternatively, another switch (not shown) may be activated by the user when hearing the ring signal from the second telephone line 15 to manually cause the TAD 100 to switch switches S1a, S1b to respective positions 2 to allow operation of the TAD 100 on the second telephone line 15 and answer the third party's call. This manual decision may be made by the user based on visual interpretation of the call related information of the third party caller or other factors.

The processes of the embodiments shown in FIGS. 2 and 3 may be combined into a single TAD device capable of automatic third party callback on a second telephone line when a third party calls a busy user on a first telephone line, and also of automatically answering selected third party callers to a second telephone line based on call related information, e.g., Caller ID.

To reduce complexity and cost, it may be possible to implement the automatic callback feature in a TAD having operation only with a single telephone line. In particular, a single telephone line automatic third party callback TAD is shown in FIG. 4.

Figure 4:
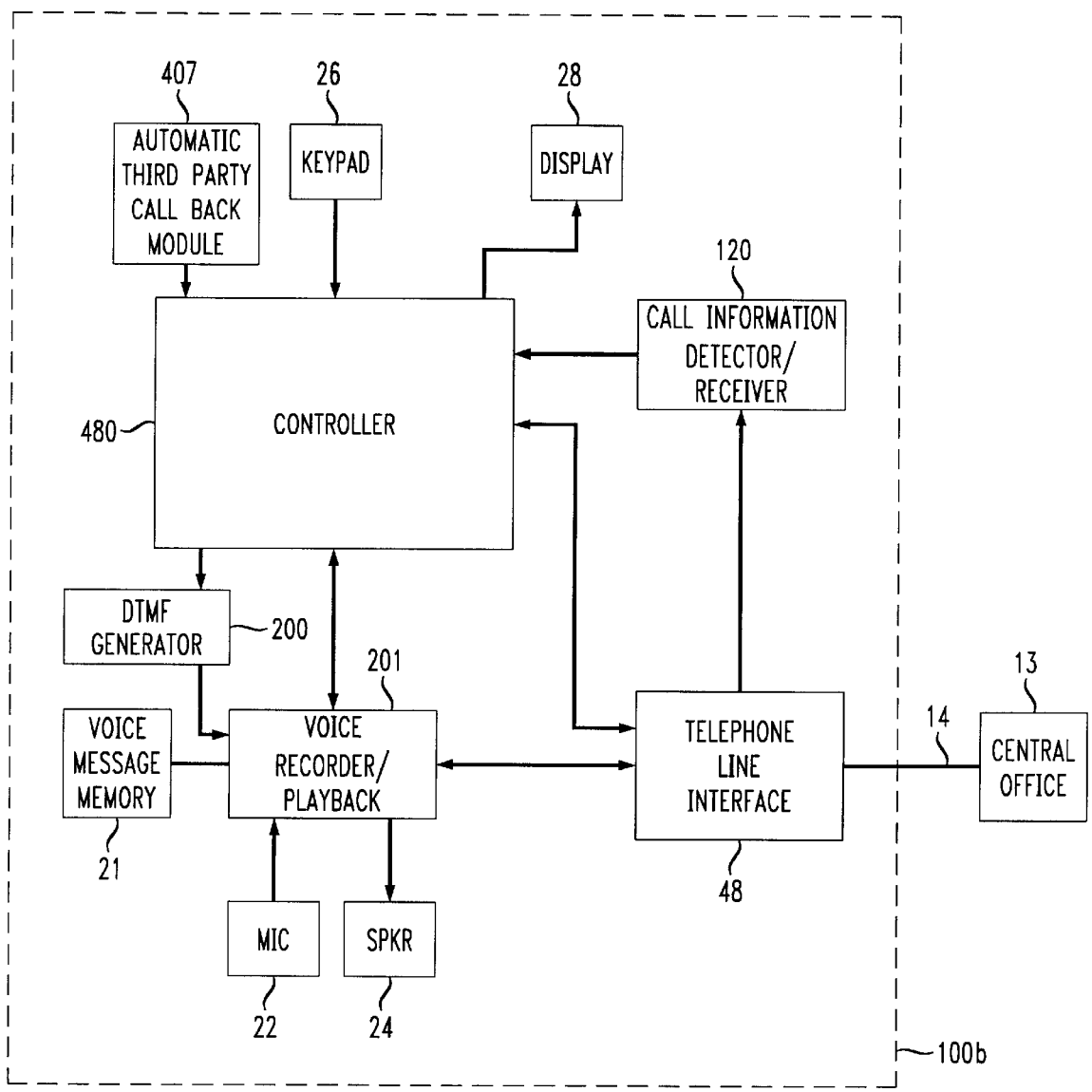
FIG. 4 shows a second embodiment of a TAD device including automatic third party callback using a single telephone line, in accordance with the present invention.
Figure 5:
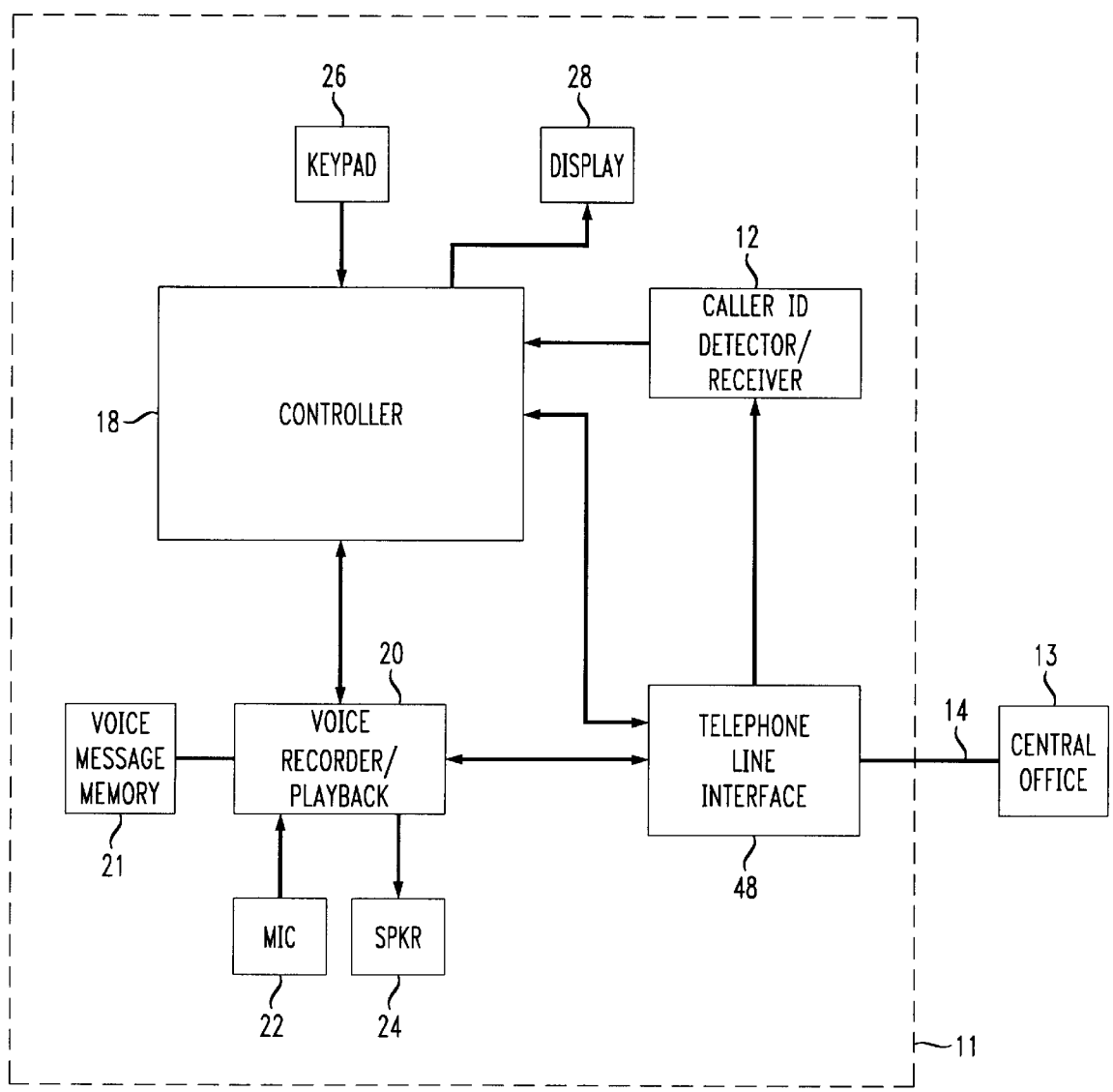
FIG. 5 shows a conventional TAD device operating on a single telephone line.

FIG. 4 shows an otherwise conventional TAD 100b. The TAD 100b shown in FIG. 4 utilizes only one TLI 48 as in conventional TAD devices, but additionally includes the important features of an automatic third party callback module 407 and DTMF generator 200 as described with respect to FIG. 1. The embodiment shown in FIG. 4 operates similar to the process shown in FIG. 2, but for step 206.

With reference to FIGS. 2 and 4, rather than calling the third party back on a second telephone line, this embodiment of the present invention provides a TAD which waits for a first telephone line 14 to be placed in an on-hook condition, i.e., hung up, and then uses the first telephone line 14 to automatically dial the third party's telephone number based on the previously stored telephone number of the third party obtained from the call related information detector/receiver 120. The TAD 100b as shown in FIG. 4 implements the remainder of the process shown in FIG. 2 as previously described with respect to the embodiment of FIG. 1.

The present invention has applications in providing other features in conjunction with a voice messaging system. For instance, if a called party is already busy on a first telephone line when a third party caller calls, the third party caller can be directed to a voice messaging system on another telephone line based on a match of the third party's call related information with an entry in pre-stored directory of authorized call related information.

While the invention has been described with reference to the exemplary preferred embodiments thereof, those skilled in the art will be able to make various modifications to the described embodiments of the invention without departing from the true spirit and scope of the invention.

What is claimed is:

1. A customer premises telephone answering device comprising:
   a processor;
   a voice recorder and playback module;
   a caller ID detector or receiver;
   an automatic callback module; and
   a first analog telephone line interface;
   wherein said voice recorder and playback module is capable of recording a voice message for a user of said telephone answering device from a third party caller without interrupting an existing telephone call.

2. The telephone answering device according to claim 1, further comprising:
   a DTMF generator.

3. The customer premises telephone answering device according to claim 1, further comprising:
   a second analog telephone line interface.

4. A telephone answering device comprising:
   a processor;
   a voice recorder and playback module;
   a caller ID detector or receiver;
   an automatic callback module;
   a first analog telephone line interface;
   a second analog telephone line interface; and
   a switch to selectably connect said first analog telephone line interface and said second analog telephone line interface to said voice recorder and playback module.
   wherein said voice recorder and playback module is capable of recording a voice message from a third party caller without interrupting an existing telephone call.

5. A customer-premises telephone answering device comprising:
   a processor;
   a voice recorder and playback module;
   a caller ID detector or receiver;
   a DTMF generator to automatically dial a telephone number based on information received by said caller ID detector or receiver; and
   a first analog telephone line interface;
   wherein said voice recorder and playback module is capable of recording a voice message for a user of said telephone answering device from a third party caller without interrupting an existing telephone call.

6. A method of automatically calling back a third party caller from a telephone answering device, said method comprising:
   establishing a first telephone call on a first telephone line through an analog telephone line interface with customer premises equipment;
   receiving in a customer premises telephone answering device indication of caller ID information with respect to a third party caller;
   storing in said telephone answering device said caller ID information for access by said telephone answering device; and
   initiating from said telephone answering device an automatic callback to said third party caller.

7. The method of automatically calling back a third party caller from a telephone answering device according to claim 6, wherein:
   said callback is made to a telephone number based on said stored caller ID information.

8. The method of automatically calling back a third party caller from a telephone answering device according to claim 6, further comprising:
   authorizing said telephone number for callback.

9. The method of automatically calling back a third party caller from a telephone answering device according to claim 6, further comprising, after said step of initiating said callback to said third party caller:
   playing an outgoing message to said third party caller.

10. The method of automatically calling back a third party caller from a telephone answering device according to claim 6, further comprising:
    recording a voice message from said third party caller.

11. A method of automatically calling back a third party caller from a telephone answering device said method comprising:
    establishing a first telephone call on a first telephone line through an analog telephone line interface with customer premises equipment;
    receiving in a customer premises telephone answering device indication of caller ID information with respect to a third party caller;
    storing in said telephone answering device said caller ID information for access by said telephone answering device; and
    initiating from said telephone answering device through a second telephone line interface an automatic callback to said third party caller while said first telephone call remains established with said customer premises equipment.

12. A method of answering a third party caller from a telephone answering device, said method comprising:
    storing in customer premises equipment a plurality of predetermined call related information;
    establishing a first telephone call on a first telephone line through an analog telephone line interface with customer premises equipment;

receiving on a second telephone line in customer premises equipment through an analog telephone line interface indication of caller ID information with respect to a third party caller;

automatically directing in customer premises equipment said third party caller to a telephone answering device on said second telephone line.

13. The method of answering a third party caller from a telephone answering device according to claim 12, further comprising comparing in said customer premises equipment said caller ID information with respect to said third party caller to said stored plurality of predetermined call related information and, if a match is found with respect to said step of comparing said caller ID information with said call related information, performing said step of automatically directing said third party caller to said telephone answering device.

14. A stand-alone telephone answering device comprising:

processing means for controlling operations of said telephone answering device;

voice recording and playback means for recording voice messages and for playing back previously recorded voice messages;

caller ID information detection and receiving means for detecting and receiving information relating to a caller;

automatic callback means for initiating a callback to a third party; and first analog telephone line interface means for interfacing said telephone answering device to a first telephone line;

wherein said voice recording and playback means is capable of recording a voice message for a user of said telephone answering device from a third party caller without interrupting an existing telephone call.

15. The telephone answering device according to claim 14, further comprising:

DTMF generating means for automatically generating DTMF tones to dial a telephone number.

16. The telephone answering device according to claim 14, further comprising:

second analog telephone line interface means for interfacing said telephone answering device to a second telephone line.

17. A telephone answering device comprising:

processing means for controlling operations of said telephone answering device;

voice recording and playback means for recording voice messages and for playing back previously recorded voice messages;

caller ID information detection and receiving means for detecting and receiving information relating to a caller;

automatic callback means for initiating a callback to a third party;

first analog telephone line interface means for interfacing said telephone answering device to a first telephone line;

second analog telephone line interface means for interfacing said telephone answering device to a second telephone line; and switch means for selectably switching said first analog telephone line interface and said second analog telephone line interface in communication with said voice recording and playback means.

wherein said voice recording and playback means is capable of recording a voice message from a third party caller without interrupting an existing telephone call.

18. A method of answering a third party caller from a telephone answering device, said method comprising:

storing in a customer premises telephone answering device a plurality of predetermined call related information;

establishing a first telephone call on a telephone line through an analog telephone line interface with customer premises equipment;

receiving in said telephone answering device caller ID information with respect to a third party caller;

comparing in said telephone answering device said caller ID information with respect to said third party caller to said stored plurality of predetermined call related information;

if a match is found with respect to said comparison of said caller ID information with said call related information, automatically calling back said third party caller on said telephone line when said telephone line becomes available.

19. A method of directing an incoming third party caller to a voice messaging system based on caller ID information, said method comprising:

storing in a telephone answering device (TAD) a plurality of predetermined call related information;

establishing with said TAD a telephone call on a first telephone line;

receiving in said TAD caller ID information with respect to a third party caller on said first telephone line;

comparing in said TAD said caller ID information with respect to said third party caller to said stored plurality of predetermined call related information; and if a match is found with respect to said comparison of said caller ID information with said call related information, directing said third party caller to a voice messaging system that records messages for a user of said TAD on a second telephone line without interrupting said telephone call on said first telephone line.

* * * * *